(12) United States Patent
Bennett et al.

(10) Patent No.: US 7,948,361 B2
(45) Date of Patent: *May 24, 2011

(54) OBTAINING BIOMETRIC IDENTIFICATION USING A DIRECT ELECTRICAL CONTACT

(75) Inventors: Richard Bennett, Redmond, WA (US); Rick V. Murakami, North Ogden, UT (US)

(73) Assignee: Ensign Holdings, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,659

(22) Filed: Nov. 19, 2002

(65) Prior Publication Data

US 2003/0128867 A1 Jul. 10, 2003

Related U.S. Application Data

(63) Continuation-in-part of application No. 09/642,459, filed on Aug. 18, 2000, now Pat. No. 6,483,929.

(60) Provisional application No. 60/210,270, filed on Jun. 8, 2000.

(51) Int. Cl.
*G06K 9/00* (2006.01)

(52) U.S. Cl. ...................................... 340/5.82; 382/115

(58) Field of Classification Search .................. 340/5.82, 340/5.52, 5.83, 5.53; 382/115, 116, 124; 713/186; 705/67

See application file for complete search history.

(56) References Cited

U.S. PATENT DOCUMENTS

| | | | |
|---|---|---|---|
| 3,991,747 A * | 11/1976 | Stanly et al. .................. 600/510 |
| 4,109,237 A | 8/1978 | Hill ............................ 340/146.3 |
| 4,537,484 A | 8/1985 | Fowler et al. ................... 354/62 |
| 4,544,267 A | 10/1985 | Schiller ........................... 356/71 |
| 4,582,985 A | 4/1986 | Lofberg ......................... 235/380 |
| 4,614,861 A | 9/1986 | Pavlov et al. .................. 235/380 |
| 4,699,149 A | 10/1987 | Rice ............................... 128/664 |
| 4,728,186 A | 3/1988 | Eguchi et al. .................... 356/71 |
| 4,784,484 A | 11/1988 | Jensen ............................. 356/71 |
| 4,846,190 A | 7/1989 | John ............................... 128/731 |
| 5,036,279 A * | 7/1991 | Jonsen ............................ 324/307 |
| 5,073,950 A | 12/1991 | Colbert et al. ..................... 382/2 |
| 5,077,803 A | 12/1991 | Kato et al. ......................... 382/4 |

(Continued)

FOREIGN PATENT DOCUMENTS

EP 1 916 615 A1 4/2008

(Continued)

OTHER PUBLICATIONS

Office Action for U.S. Appl. No. 09/815,885, filed Mar. 23, 2001, mailed from USPTO on Mar. 17, 2008, 12 pgs.

(Continued)

*Primary Examiner* — Edwin C Holloway, III

(74) *Attorney, Agent, or Firm* — John R. Thompson; Stoel Rives LLP

(57) ABSTRACT

Systems and methods for employing histological and physiological biometric markers that are substantially unique to an individual in order to activate a device, participate in a transaction, or identify himself or herself, wherein at least one biometric marker is obtained by one or more electrical contacts on the surface of the skin. A biometric identification of an individual is obtained by a heartbeat waveform, which is acquired by one or more direct electrical contacts. A mechanism for biometric authentication is used that includes one or more electrodes, an electrical signal receiver, a memory module, and a processing module.

27 Claims, 8 Drawing Sheets

U.S. PATENT DOCUMENTS

| | | | |
|---|---|---|---|
| 5,088,817 A | 2/1992 | Igaki et al. | 356/71 |
| 5,103,486 A | 4/1992 | Grippi | 382/4 |
| 5,152,288 A * | 10/1992 | Hoenig et al. | 600/409 |
| 5,172,698 A * | 12/1992 | Stanko | 600/510 |
| 5,180,901 A | 1/1993 | Hiramatsu | 235/380 |
| 5,230,025 A | 7/1993 | Fishbine et al. | 382/4 |
| 5,311,867 A * | 5/1994 | Kynor | 600/409 |
| 5,325,862 A * | 7/1994 | Lewis et al. | 600/544 |
| 5,335,288 A | 8/1994 | Faulkner | 382/4 |
| 5,456,256 A | 10/1995 | Schneider et al. | |
| 5,526,808 A | 6/1996 | Kaminsky | |
| 5,586,171 A * | 12/1996 | McAllister et al. | 379/88.02 |
| 5,623,552 A | 4/1997 | Lane | 382/124 |
| 5,632,272 A | 5/1997 | Diab et al. | |
| 5,666,400 A | 9/1997 | McAllister et al. | 379/67 |
| 5,704,352 A | 1/1998 | Tremblay et al. | 128/630 |
| 5,719,950 A | 2/1998 | Osten et al. | 382/115 |
| 5,737,439 A | 4/1998 | Lapsley et al. | 382/115 |
| 5,771,894 A * | 6/1998 | Richards et al. | 600/409 |
| 5,774,571 A | 6/1998 | Marshall | 382/119 |
| 5,789,733 A | 8/1998 | Jachimowicz et al. | 235/492 |
| 5,793,881 A * | 8/1998 | Stiver et al. | 382/115 |
| 5,872,834 A | 2/1999 | Teitelbaum | 379/93.03 |
| 5,935,062 A | 8/1999 | Messerschmidt et al. | |
| 5,982,914 A | 11/1999 | Lee et al. | |
| 5,987,232 A | 11/1999 | Tabuki | 395/187.01 |
| 6,088,585 A | 7/2000 | Schmitt et al. | 455/411 |
| 6,104,913 A | 8/2000 | McAllister | 455/41 |
| 6,104,922 A | 8/2000 | Baumann | 455/410 |
| 6,148,094 A | 11/2000 | Kinsella | 382/124 |
| 6,164,403 A | 12/2000 | Wuidart | 180/287 |
| 6,171,112 B1 | 1/2001 | Clark et al. | 434/322 |
| 6,182,892 B1 | 2/2001 | Angelo et al. | 235/380 |
| 6,193,153 B1 | 2/2001 | Lambert | 235/380 |
| 6,202,151 B1 | 3/2001 | Musgrave et al. | 713/186 |
| 6,208,264 B1 | 3/2001 | Bradney et al. | 340/825.31 |
| 6,219,639 B1 | 4/2001 | Bakis et al. | |
| 6,225,890 B1 | 5/2001 | Murphy | 340/426 |
| 6,232,874 B1 | 5/2001 | Murphy | 340/426 |
| 6,266,566 B1 | 7/2001 | Nichols et al. | |
| 6,269,348 B1 | 7/2001 | Pare, Jr. et al. | 705/39 |
| 6,275,806 B1 | 8/2001 | Pertrushin | 704/272 |
| 6,289,453 B1 | 9/2001 | Walker et al. | 713/175 |
| 6,483,929 B1 | 11/2002 | Murakami et al. | |
| 6,496,595 B1 | 12/2002 | Puchek et al. | |
| 6,507,662 B1 * | 1/2003 | Brooks | 340/5.82 |
| 6,539,380 B1 * | 3/2003 | Moran | 707/9 |
| 6,628,809 B1 * | 9/2003 | Rowe et al. | 382/115 |
| 6,681,029 B1 | 1/2004 | Rhoads | |
| 6,816,605 B2 | 11/2004 | Rowe et al. | |
| 6,898,299 B1 * | 5/2005 | Brooks | 382/115 |
| 6,920,231 B1 | 7/2005 | Griffin | |
| 7,113,616 B2 | 9/2006 | Ito et al. | |
| 7,133,792 B2 | 11/2006 | Murakami et al. | |
| 7,188,362 B2 | 3/2007 | Brandys | |
| 7,214,953 B2 | 5/2007 | Setlak et al. | |
| 7,358,514 B2 | 4/2008 | Setlak et al. | |
| 7,441,123 B2 | 10/2008 | Grant et al. | |
| 2001/0033220 A1 | 10/2001 | Stone et al. | 340/5.52 |
| 2002/0138768 A1 * | 9/2002 | Murakami et al. | 340/5.82 |
| 2002/0174347 A1 | 11/2002 | Ting | |
| 2003/0135097 A1 * | 7/2003 | Wiederhold et al. | 600/301 |
| 2003/0233557 A1 | 12/2003 | Zimmerman | |
| 2004/0187037 A1 | 9/2004 | Checco | |
| 2005/0223234 A1 | 10/2005 | McOwen et al. | |
| 2005/0267752 A1 | 12/2005 | Navratil et al. | |
| 2006/0067573 A1 | 3/2006 | Parr et al. | |
| 2006/0093190 A1 | 5/2006 | Cheng et al. | |
| 2006/0116970 A1 | 6/2006 | Scherzer et al. | |
| 2006/0171571 A1 | 8/2006 | Chan et al. | |
| 2006/0210119 A1 | 9/2006 | Willis et al. | |
| 2006/0293892 A1 | 12/2006 | Pathuel | |
| 2007/0016088 A1 | 1/2007 | Grant et al. | |
| 2007/0016777 A1 | 1/2007 | Henderson et al. | |
| 2007/0063816 A1 | 3/2007 | Murakami et al. | |
| 2007/0129941 A1 | 6/2007 | Taveres | |
| 2007/0192591 A1 | 8/2007 | Yumoto et al. | |
| 2008/0242231 A1 | 10/2008 | Gray | |
| 2008/0260211 A1 | 10/2008 | Bennett et al. | |

FOREIGN PATENT DOCUMENTS

| | | |
|---|---|---|
| JP | SHO 60-126787 | 7/1985 |
| JP | SHO 61-175865 | 8/1986 |
| JP | SHO 63-20583 | 1/1988 |
| JP | SHO 63-53099 | 3/1988 |
| JP | SHO 63-120385 | 5/1988 |
| JP | SHO 63-313288 | 12/1988 |
| JP | HEI 1-175362 | 12/1989 |
| JP | HEI 4-24889 | 1/1992 |
| JP | 2000-181871 | 6/2000 |
| WO | WO 88/04153 | 6/1988 |
| WO | WO 98/37519 | 8/1998 |

OTHER PUBLICATIONS

Biel, Lena et al., "ECG Analysis: A New Approach in Human Identification," 1999 IEEE, pp. 557-561.

Office Action for U.S. Appl. No. 09/758,836, filed Jan. 10, 2001, mailed from the USPTO on Apr. 17, 2007, 12 pgs.

Office Action for U.S. Appl. No. 09/758,836, filed Jan. 10, 2001, mailed from the USPTO on Jul. 23, 2008, 16 pgs.

Office Action for U.S. Appl. No. 09/814,607, filed Mar. 22, 2001, mailed from the USPTO on Dec. 19, 2008, 14 pgs.

Office Action for U.S. Appl. No. 09/758,836, filed Jan. 10, 2001, mailed from USPTO Feb. 4, 2009, 15 pgs.

International Search Report for PCT/US09/31638, filed Jan. 22, 2009, mailed Mar. 6, 2009, 12 pgs.

Kachigan, Sam Kash, "Multivariate Statistical Analysis," Radius Press, 1991, 1986, 1982, 4 pgs.

Hayes, Matthew J., et al., "Quantitative Evaluation of Photoplethysmographic Artefact Reduction for Pulse Oximetry," Optical Engineering Group, Department of Electrical and Electronic Engineering, Loughborough University, Loughborough, Leicestershire, LE11 3TU, UK, SPIE vol. 3570, Sep. 1, 1998, 14 pgs.

Scholz, Udo, J., "Multivariate Spectral Analysis of the Beat-to-Beat Sampled Cortical NIRS-Signals and the Heart Rate Variability," Department of Neurology, Charite, Humboldt University, Berlin, Germany, SPIE vol. 3566, Sep. 1998, 6 pgs.

Hoeksel, S.A., et al., "Detection of Dicrotic Notch in Arterial Pressure Signals," Department of Anesthesiology, Cardiovascular Research Institute Maastricht, Maastricht University, The Netherlands, www.medscape.com, 1997, 1 pg.

Cysewska-Sobusiak, Anna, "Noninvasive Monitoring of Arterial Blood Oxygenation with Spectrophotometric Technique," Institute of Electronics and Communications, Technical University of Poznan, Piotrowo 3a, PL-60-965 Poznan, Poland, SPIE vol. 1711, 1992, 14 pgs.

"Artificial Pacemaker," Wikipedia, the free encyclopedia, 3 pgs.

"Type: Rate-Responsive Pacing Systems," Medtronic, 1 pg.

Leichter, I., et al., "Effect of Age and Sex on Bone Density, Bone Mineral Content and Cortical Index," Energy Citations Database (ECD)—Energy and Energy-Related Bibliographic Citations, May 1, 1981, 2 pgs.

Miller, Paul D., M.D., "Increased Age Is a Risk Factor," "Assessing Fracture Risk: Which Factors Are Clinically Most Important?" 4 pgs.

Smith, SL, "Attribution of Hand Bones to Sex and Population Groups," Journal of Forensic Sciences, vol. 41, Issue 3, www.astm.org/cgi-bin/SoftCart.exe/JOURNALS/FORENSIC/PAGES/JFS41396046, May 1996, printed Jan. 14, 2007, 1 pg.

Jain, Anil K., et al., "Multibiometric Systems," Communications of the ACM, Jan. 2004, vol. 47, No. 1, pp. 34-40.

Office Action for U.S. Appl. No. 12/125,740, filed May 22, 2008, mailed from USPTO Jul. 9, 2010, 20 pgs.

Office Action for U.S. Appl. No. 12/563,937, filed Sep. 21, 2009 mailed from USPTO Sep. 9, 2010, 21 pgs.

Office Action for U.S. Appl. No. 12/563,941, filed Sep. 21, 2009, mailed from USPTO Oct. 28, 2010, 22 pgs.

* cited by examiner

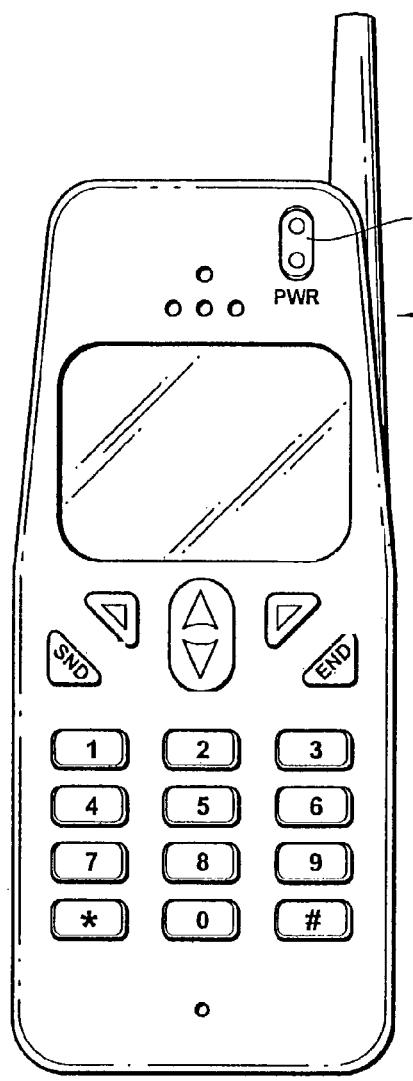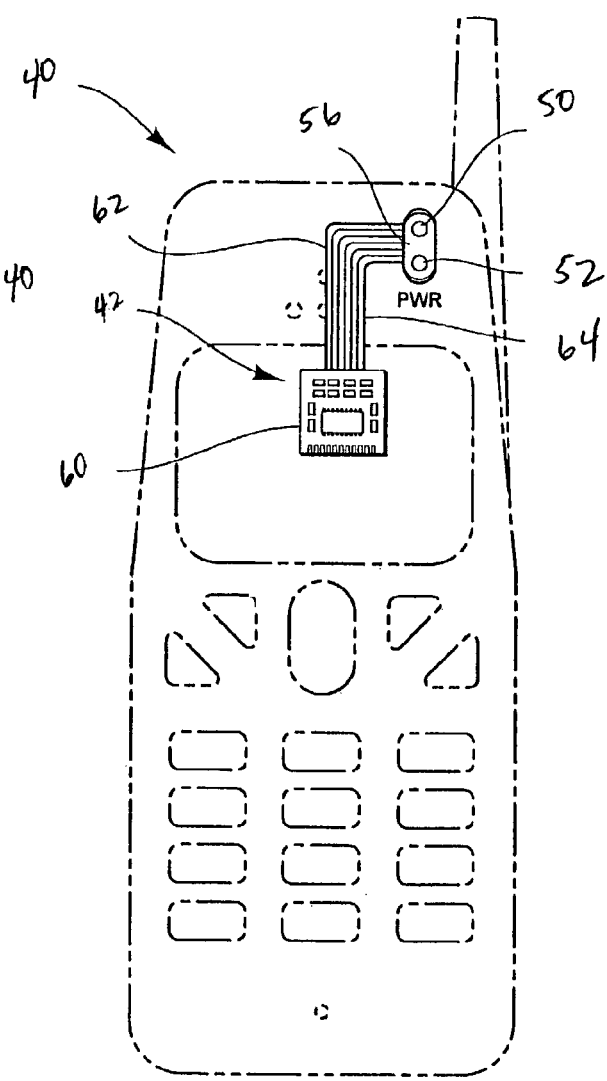
Fig. 3                    Fig. 4

OBTAINING BIOMETRIC IDENTIFICATION USING A DIRECT ELECTRICAL CONTACT

RELATED APPLICATION

This application is a continuation-in-part of U.S. patent application Ser. No. 09/642,459, now U.S. Pat. No. 6,483,929 filed Aug. 18, 2000, entitled METHOD AND APPARATUS FOR HISTOLOGICAL AND PHYSIOLOGICAL BIOMETRIC OPERATION AND AUTHENTICATION, which claims priority to U.S. Provisional Application 60/210,270 filed Jun. 8, 2000, titled METHOD AND APPARATUS FOR HISTOLOGICAL AND PHYSIOLOGICAL BIOMETRIC OPERATION AND AUTHENTICATION.

BACKGROUND OF THE INVENTION

1. Field of the Invention

The present invention relates to obtaining biometric identification to activate a device or authenticate a participant in a transaction using histological and/or physiological traits. More particularly, the present invention relates to systems and methods for employing histological and physiological biometric markers that are substantially unique to an individual in order to permit an individual to activate a device, participate in a transaction, or identify himself or herself, wherein at least one biometric marker is obtained by one or more electrical contacts on the surface of the skin.

2. Background and Related Art

The computer industry has recognized a growing need for sophisticated security systems for computer and electronic devices. The security systems prevent unauthorized use and authenticate or identify individuals through electronic means. The biometric authentication industry has developed in response to this need. Biometrics is the measurement of quantifiable biological traits. Certain biological traits, such as the unique characteristics of each person's fingerprint, have been measured and compared and found to be unique or substantially unique for each person. These traits are referred to as biometric markers. The computer and electronics industry is developing identification and authentication means that measure and compare certain biometric markers with the intention of using the markers as biological "keys" or "passwords."

Biometric markers presently used by the industry for authentication and identification include the use of measurements of unique visible features such as fingerprints, hand and face geometry, and retinal and iris patterns, as well as the measurement of unique behavioral responses such as the recognition of vocal patterns and the analysis of hand movements. The use of each of these biometric markers requires a device to make the biological measurement and process it in electronic form. The device may measure and compare the unique spacing of the features of a person's face or hand and compare the measured value with a value stored in the device's memory. Where the values match, the person is identified or authorized.

Several types of technologies are used in biometric identification of superficial anatomical traits. For example, biometric fingerprint identification systems may require the individual being identified to place their finger on a visual scanner. The scanner reflects light off of the person's finger and records the way the light is reflected off of the ridges that make up the fingerprint. Hand and face identification systems use scanners or cameras to detect the relative anatomical structure and geometry of the person's face or hand. Different technologies are used for biometric authentication using the person's eye. For retinal scans, a person will place their eye close to or upon a retinal scanning device. The scanning device will scan the retina to form an electronic version of the unique blood vessel pattern in the retina. An iris scan records the unique contrasting patterns of a person's iris.

Still other types of technologies are used for biometric identification of behavioral traits. Voice recognition systems generally use a telephone or microphone to record the voice pattern of the user received. Usually the user will repeat a standard phrase, and the device compares the measured voice pattern to a voice pattern stored in the system. Signature authentication is a more sophisticated approach to the universal use of signatures as authentication. Biometric signature verification not only makes a record of the pattern of the contact between the writing utensil and the recording device, but also measures and records speed and pressure applied in the process of writing.

Each of the prior art systems has a number of disadvantages. For example, fingerprint databases may raise significant privacy issues for those whose information is entered in the system. Hand and facial geometry recognition systems may require large scanners and/or expensive cameras. Voice recognition devices have problems screening out background noise. Signature recognition devices are subject to variations in the behavior of the individual. Retinal devices may require users to place their eye close to or on a scanning device, exposing the user to potential infection.

Another disadvantage of the prior art to biometric authentication is the limited number of biometric markers that are unique to each individual and that are practical for implementing in computer and electronic devices. Because the biometric patterns used in the prior art to authenticate a person are potentially completely unique to each person, the differences that distinguish one person from another person may be subtle. It may require a high degree of electronic sophistication to read and differentiate between the various unique aspects of the biometric marker. If the biometric marker is used to identify an individual from a large group of individuals, the computer memory storage and processing capability may also have to be sophisticated, and therefore, may be expensive.

Another disadvantage of prior art is that with relatively few truly unique biometric markers, it is likely that use of those markers, such as a fingerprint, would be widespread. The widespread use of just one or two types of markers increases the likelihood that an unauthorized person could, by chance or otherwise, be improperly granted access. If an unauthorized person were improperly given access, that individual may have access to numerous secured devices or accounts. This is the same problem that exists when a person chooses the same password for all his accounts or electronic devices.

U.S. Pat. No. 4,537,484 to Fowler et al. discloses a fingerprint imaging apparatus for use in an identity verification system. The system uses light, which is reflected off the finger through a system of mirrors to a linear photo diode ray. The fingers rotated mechanically in order to scan the entire fingerprint.

U.S. Pat. No. 4,544,267 to Shore discloses an identification device that uses a beam of collimated light to scan the fingerprint. The light beam is then imaged onto a linear ray of photo-responsive devices. The information is processed to provide a set of signals containing fingerprint information.

U.S. Pat. No. 4,699,149 to Rice discloses a device for detecting the position of subcutaneous blood vessels such as by using the reflection of incident radiation off of a user's skin. The measured pattern is then compared with a previously determined pattern to verify the identity of the user.

U.S. Pat. No. 4,728,186 to Eguchi et al. discloses another method for detecting data an uneven surface such as a finger, namely a fingerprint, using a light source illuminating the uneven surface through a transparent plate.

U.S. Pat. No. 4,784,484 to Jensen discloses an apparatus for automatic scanning of a fingerprint using an optical scanner. The user slides his finger across a scanning surface and an optical scanning system generates an electrical signal as a function of the movement of the finger across the optical scanning surface.

U.S. Pat. No. 5,073,950 to Colbert et al. discloses a method and apparatus for authenticating and verifying the identity of an individual based on the profile of a handprint using an optical scanner.

U.S. Pat. No. 5,077,803 to Kito et al. discloses a fingerprint collating system employing a biological detecting system.

U.S. Pat. No. 5,088,817 discloses an apparatus for detecting and identifying a biological object by projecting a light beam onto the object and detecting the reflective light using an optical detector. The change in the wavelength characteristics of the light beam can be compared to a previously determined pattern.

U.S. Pat. No. 5,230,025 discloses a system for generating data characteristics of a rolled skin print using an optical device that can convert reflective light beams into an electronic signal and generate digital data representative of the image of the skin print.

U.S. Pat. No. 5,335,288 to Faulkner discloses a biometric measuring apparatus that uses silhouette and light images to measure a person's hand features. The features are converted to electronic data and stored and later compared for identification purposes.

Some biometric authentication systems combine biometric measurements with conditions behavior such as signature writing styles and voice patterns or intonations. For example, U.S. Pat. No. 5,103,486 to Grippey discloses a signature verification system utilizing a hand held writing implement that produces data regarding a person's fingerprint pattern and their hand written signature.

Other biometric authentication systems include means for verifying physiological activity. These means for verifying physiological activity are primarily to prevent an unauthorized person from using dead tissues as a means for circumventing the authentication process. For example, U.S. Pat. No. 5,719,950 to Osten et al. discloses a personal biometric authentication system wherein inherently specific biometric parameters are measured and recognized and at least one non-specific biometric parameter is recognized and compared with physiological norms. Likewise, U.S. Pat. No. 5,727,439 to Lapsley et al. discloses an antifraud biometric scanner that determines whether blood flow is taking place in the object being scanned and whether such blood flow is consistent with that of a living human.

Thus, while biometric authentication techniques currently exist, challenges and/or problems are present in the available techniques. Accordingly, it would be an improvement in the art to augment or even replace current techniques with other techniques.

SUMMARY OF THE INVENTION

The present invention relates to obtaining biometric identification to activate a device or authenticate a participant in a transaction using histological and/or physiological traits. More particularly, the present invention relates to systems and methods for employing histological and physiological biometric markers that are substantially unique to an individual in order to permit an individual to activate a device, participate in a transaction, or identify himself or herself, wherein at least one biometric marker is obtained by one or more electrical contacts on the surface of the skin.

Implementation of the present invention takes place in association with a mechanism that is used for identification and authentication using physiological and/or histological biometric markers. In at least one implementation, the biometric markers are substantially unique to each person and are not merely measurements of superficial anatomical structure or behavioral traits. Instead, the markers utilize or alternatively include measurements of physiological traits of one or more systems of the human body and/or are histological traits associated with tissues of the human body.

In at least some implementations of the present invention, a biometric identification of an individual is obtained by a heartbeat waveform, which is acquired by one or more direct electrical contacts. Accordingly, in at least some implementations of the present invention a mechanism or device for biometric authentication includes one or more electrodes capable of receiving one or more electrical signals from an individual to measure at least one trait of an internal physiological process. The traits are unique and inherently specific to the individual.

The individual's body transmits the electrical energy. The mechanism or device also includes an electrical signal receiver that is capable of collecting a portion of the partly transmitted electrical energy. A memory module is used that is capable of storing data related to the electrical energy collected by the receiver, wherein the data is related to the traits of the internal physiological process that are unique to the individual.

A processing module is used to process and compare the transmitted electrical energy and stored data for use in biometric authentication based upon the traits of the internal physiological process. In at least some implementations of the present invention, rather than identifying a particular individual, the mechanism simply obtains characteristics to match a profile to grant access to a device, facility, funds, function or electronic information.

Implementation of the present invention further contemplates the use of internal biometric markers that are not representative of any particular traits but are a composite of various physiological and/or histological traits. While the biometric markers of the present invention may be entirely unique to each person, markers that are not entirely unique but that are substantially unique may be used in the authentication process. In using substantially unique biometric markers, the present invention also allows a wide variety of biometric characteristics to be employed in a relatively compact and inexpensive device.

In at least some implementations of the present invention, biological markers are employed that are substantially unique, that remain relatively consistent from measurement to measurement, and that preferably are capable of being measured without physically invasive procedures. Moreover, some implementations of the present invention provide for the use of a layering technique, which enhances the security capabilities of the present invention. Layering is a technique that employs the use of more than one biometric marker for authentication. Where multiple biometric markers are used to authenticate a transaction, the odds that an unauthorized individual will replicate the authorized person's biometric profile may decrease with the addition of another biometric characteristic to the authentication process.

Implementation of the present invention may also avoid some of the privacy issues and other disadvantages associated with prior art biometric markers by employing unique physiological or histological biometric markers. For example, use of a physiological marker such as piezoelectric current of the body or arterial blood pressure is less likely to raise the types of privacy issues associated with the use of fingerprints, does not require expensive scanning equipment, is not subject to behavioral variability, and does not raise issues of undesirable and potentially infectious contact with sensitive tissues.

The use of physiological and histological markers allows the devices in which such a biometric system is used to be both secure and readily manufactured and marketable. Because of the variety of ways in which the physiological markers can be measured and the variety of markers that can be used in the system, the present invention allows for greater flexibility and variability in the design of the device. Prior art systems rely upon the measurement of superficial anatomical structure thereby limiting the application of the associated system. For example, it is in many circumstances financially and technologically impractical to develop a facial or hand recognition system for portable devices such as laptops or PDAs. Contrary to the current trend in the biometric industry, the present invention does not limit the types of markers used to superficial anatomical structure or complex behavioral activity and thus expands the potential applications.

Implementation of the present invention provides for the use of histological traits of various human tissues. Various kinds of human tissue, such as epithelial tissue, connective tissue, muscle tissue, and nervous tissue, have characteristics (e.g., a piezoelectric current and other characteristics) that are substantially unique to each person. For example, the depth of the various layers of epithelial tissue from a given point on the skin surface may be a substantially unique histological trait that can be used as a biometric marker. The piezoelectric current of tissue of the body provides a substantially unique histological trait for use as a biometric marker. The density of a particular kind of connective tissue, such as bone density, may be a substantially unique histological trait that can be employed in a biometric authentication system. Likewise, the light absorption characteristics of muscle tissue could be a substantially unique histological trait, as could the electrical resistance of nervous tissue.

The examples given, which are representative and are not intended to be limiting, demonstrate that histologically based biometric markers provide advantages not found in the prior art and in particular, can be used to improve security and increase the variety of applications for which biometric markers are used.

In the same way that histological markers increase both the marketability and security of biometric systems, physiologically based biometric markers also provide advantages for the present invention. Physiological markers do not require the scanning or mapping of anatomical structure. Neither do they require the analysis of volitional acts, as are required with voice or signature analysis. Physiological markers are based upon non-volitional, physiological processes and phenomenon that occur in the body. These markers include physiological processes associated with, but not limited to the (integumentary) system, the skeletal system, the muscular system, the pulmonary system, the respiratory system, the circulatory system, the sensory system, the nervous system, the digestive system, the urinary system, the endocrine system, and the reproductive system. Included in the physiological biometric markers are those activities associated with the various physiological systems that occur automatically or, in other words, are non-volitional. All of these systems and related subsystems provide traits that can be measured in a variety of ways to provide substantially unique biometric markers for the present invention.

Physiological and histological biometric markers may be measured in common units such as spacial measurements of length, area, and volume. Frequency is also another type of measurement that can be practically applied to histological and physiological biometric markers. Current is yet another type of measurement.

Implementation of the present invention also provides for the monitoring of biometric markers in a variety of other additional ways. The relative motion of particles and fluids can be measured in terms of velocity, acceleration, volumetric flow rate or angular velocity, and angular acceleration. Physical interaction such as force, surface tension, pressure, viscosity, work, and torque are other possible measurements. The physiological and histological markers may also be based upon energy or heat related characteristics such as power, heat quantity, heat flux, volumetric heat release, heat transfer coefficient, heat capacity, and thermal conductivity. Likewise, measurements, such as electric quantity, electromotive force, electric field strength, electric resistance, and electrical capacities, could provide biometric markers, depending upon the tissue or physiological process being monitored. Magnetic related characteristics, such as magnetic flux, induce, magnetic permeability, magnetic flux density, magnetic field strength, and magneto-motive force could be used. Other potential measurements may include luminous flux, luminance, illumination, radio nucleotide activity, radioactivity, temperature, and absorbed dose and dose equivalent, and amount of substance (mole).

While the methods and processes of the present invention have proven to be particularly useful in the area of obtaining a piezoelectric current of at least a portion of an individual's body, those skilled in the art will appreciate that the methods and processes can be used in a variety of different applications to obtaining a variety of biometric identifications/markers that may be used to activate a device or authenticate a participant in a transaction using histological and/or physiological traits.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 4 illustrates a transparent front view of the electronic appliance of FIG. 3 revealing the biometric authentication device;

FIG. 9 illustrates a schematic diagram of one embodiment of a receiver of present invention.

DETAILED DESCRIPTION OF THE INVENTION

The present invention relates to obtaining biometric identification to activate a device or authenticate a participant in a transaction using histological and/or physiological traits. More particularly, the present invention relates to systems and methods for employing histological and physiological biometric markers that are substantially unique to an individual in order to permit an individual to activate a device, participate in a transaction, or identify himself or herself, wherein at least one biometric marker is obtained by one or more electrical contacts on the surface of the skin.

Embodiments of the present invention embrace the use of a mechanism for identification and authentication of an individual using physiological and/or histological biometric markers. In one embodiment, the biometric markers are substantially unique to each person and are not merely measurements of superficial anatomical structure or behavioral traits. Instead, the markers utilize or alternatively include measurements of physiological traits of one or more systems of the human body and/or are histological traits associated with tissues of the human body.

Figure 1:
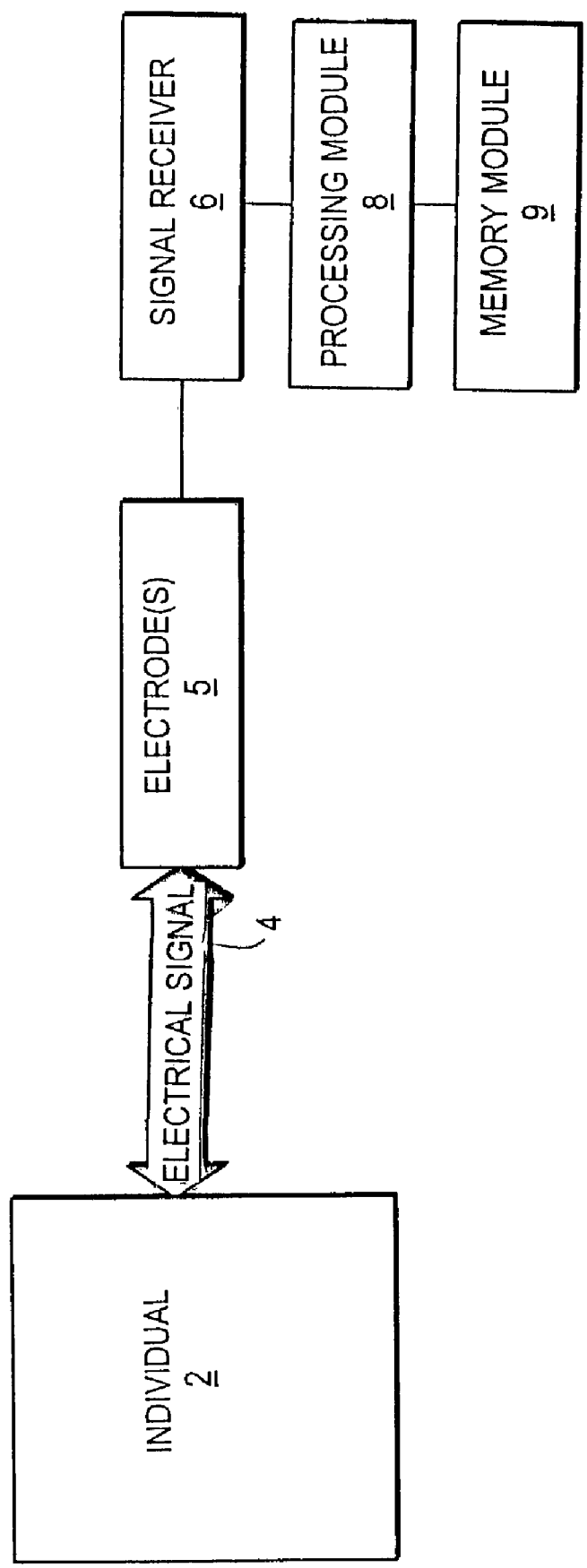
FIG. 1 illustrates a block diagram of a representative system for employing histological and physiological biometric markers that are substantially unique to an individual in order to permit an individual to activate a device, participate in a transaction, or identify himself or herself, wherein at least one biometric marker is obtained by one or more electrical contacts on the surface of the skin.

With reference now to FIG. 1, a block diagram is illustrated of a representative system for employing histological and physiological biometric markers that are substantially unique to an individual in order to permit an individual to activate a device, participate in a transaction, or identify himself or herself, wherein at least one biometric marker is obtained by one or more electrical contacts on the surface of the skin. In FIG. 1, a biometric identification of an individual is obtained by a heartbeat waveform, which is acquired by one or more direct electrical contacts. Thus, an individual 2 provides an electrical signal 4 to one or more electrodes 5. The mechanism or device for biometric authentication includes the one or more electrodes 5, which are capable of receiving one or more electrical signals 4 from an individual 2 to measure at least one trait of an internal physiological process. The traits are unique and inherently specific to the individual.

The individual's body transmits the electrical energy. The mechanism or device also includes an electrical signal receiver 6 that is capable of collecting a portion of the partly transmitted electrical energy. A memory module 9 is used that is capable of storing data related to the electrical energy collected by the receiver 6, wherein the data is related to the traits of the internal physiological process that are unique to the individual. A processing module 8 is used to process and compare the transmitted electrical energy (signal 4) and stored data for use in biometric authentication based upon the traits of the internal physiological process. In some embodiments, rather than identifying a particular individual, the mechanism simply obtains characteristics to match a profile to grant access to a device, facility, funds, function or electronic information.

In one embodiment, an electrical current provided in the direction towards a positive end of a bipolar electrode causes a positive deflection of a stylus. If the number of myocardial cells (dipoles) in this direction increases, the current increases as well. An electrical current in the direction away from the positive end of a bipolar electrode causes a negative deflection of the stylus. If the number of myocardial cells (dipoles) in this direction increases, the current will increase as well.

In a further embodiment, one or more contact points are connected to an individual, such as to a distal end of an individual's finger or another portion of the individual's body. The contacts receive a signal from the individual's body and the one or more electrodes employed include a recording electrode or a pair of recording electrodes at a specified location. In one embodiment, a connection is used as a ground.

In a further embodiment, one or more unipolar connections record electric potential changes of a biometric marker of the individual. Each contact records the electrical variations that occur directly under the contact.

In a further embodiment of the present invention, an electrical contact is made with the surface of the skin of an individual. An electrical signal is received from the individual. In one embodiment, three contacts are employed, wherein one of the contacts is a ground are provided. However, those skilled in the art will appreciate that embodiments of the present invention embrace the use of less than three contacts or more than three contacts. Moreover, embodiments of the present invention embrace the contacts as individual sensors. Furthermore, embodiments of the present invention embrace the use of the contacts in one or more channels, indentations, receiving pads, casings, clamping devices, receivers, or other such sensing devices configured to receive an electrical signal from a portion of an individual's body for use in obtaining a biometric marker.

Figure 2:
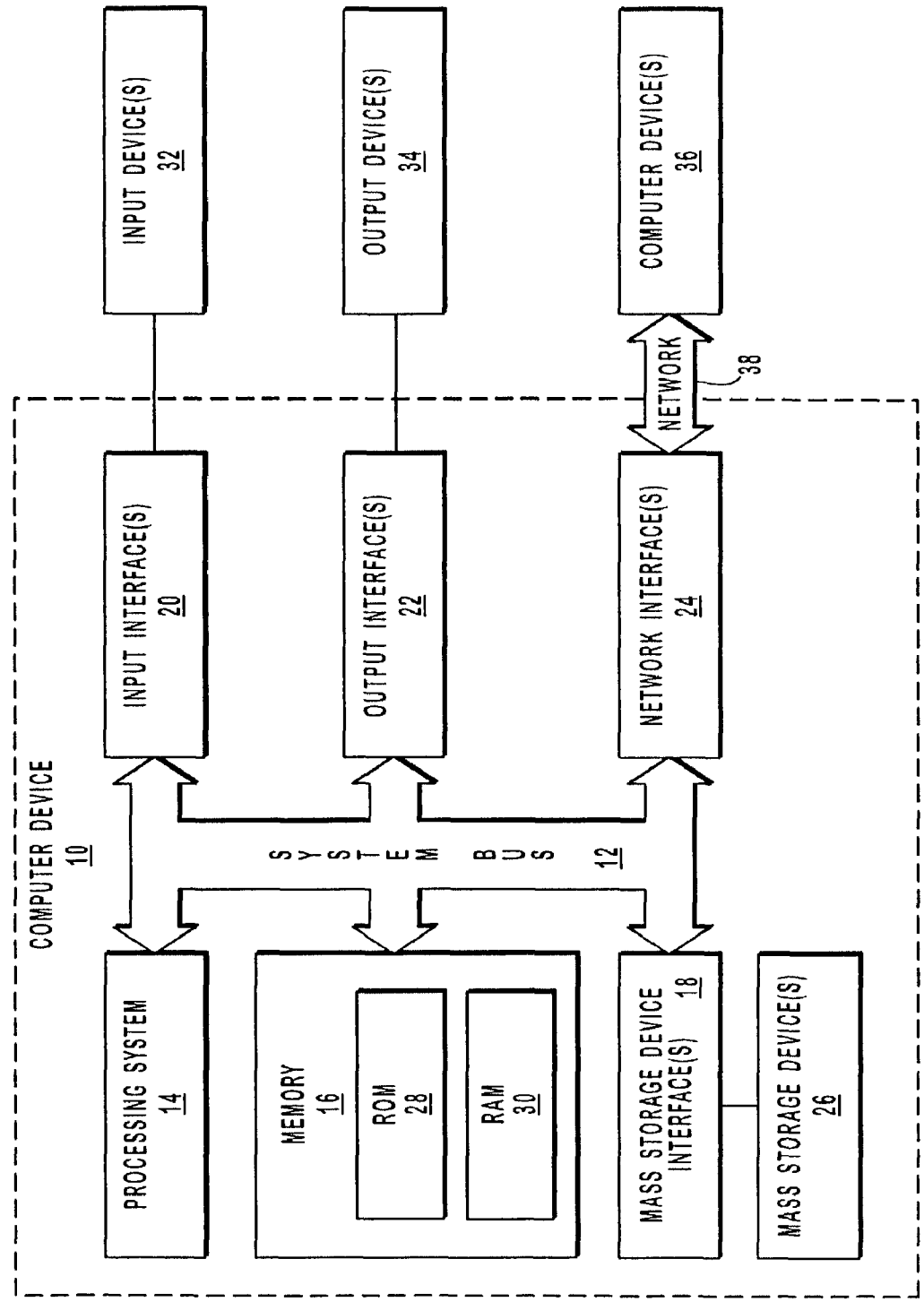
FIG. 2 is a representative embodiment of a computer device that may be used in association with the system of FIG. 1.

With reference now to FIG. 2, a general description of a suitable operating environment is provided for preserving and processing biometric data received. Embodiments of the present invention embrace one or more computer readable media, wherein each medium may be configured to include or includes thereon data or computer executable instructions for manipulating or comparing biometric data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 2, a representative system processing and comparing biometric data includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14, which is an example of processing module 8 of FIG. 1, and memory 16, which is an example of memory module 9 of FIG. 1. Other components may optionally include one or more mass storage device interfaces 18, input interfaces 20, output interfaces 22, and/or network interfaces 24, each of which will be discussed below.

Processing system 14 is an example of processing module 8 (FIG. 1) and includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 is an example of memory module 9 (FIG. 1) and includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may optionally be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. One example of an input device includes a signal receiver 6 (FIG. 1). Other examples of input devices include a keyboard and alternate input devices, such as a mouse, sensor, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

In a preferred embodiment of the present invention, a biometric marker related to an electric characteristic of an individual's body is used to provide authentication and security for a device for a transaction. In one preferred embodiment, one or more electric sensors are connected to the outer surface of a user's body, such as the user's finger. The electric sensors receive an electric signal or characteristic from the user's body that is then be stored in an electronic format.

Other biometric markers obtained may come from a changing pressure within the artery or arteries being monitored and can be described and analyzed as a hemodynamic waveform. The arterial pressure fluctuates as a result of the cardiac cycle. As the heart's atrium ventricles contract and relax (undergo systole and diastole), pressure in the arterial blood vessels correspondingly rises and falls in a wave-like manner. This pressure waveform or a waveform of an electrical signal received from the user's body has distinct characteristics. For example, for the hemodynamic waveform the characteristics result from the timing of systole and diastole and the opening and closing of the cardiac valves. The waveform of one preferred embodiment may be a composite waveform reflecting events in the cardiac cycle, for example: peak systolic pressure, the dicrotic notch, diastolic pressure, the anacrotic notch, and potentially pulse pressure.

In the cardiac cycle, when the right ventricle begins to contract and the pressure in the right ventricle builds, the pulmonic valve opens and blood is passed from the right ventricle into the pulmonary artery, and the pressure in the pulmonary artery naturally increases. As the right ventricle begins to relax, pressure in the pulmonary artery begins to drop. When the pressure in the ventricle declines sufficiently, the pulmonic valve closes and diastole begins. When the pulmonic valve closes, the decline in pressure, as reflected in the waveform, is interrupted by a brief upward movement in the waveform. This interruption is referred to as a dicrotic notch.

Likewise, a dicrotic notch is seen in connection with the aortic valve. When the aortic valve of the heart opens, arterial pressure quickly increases. The arterial pressure increase is the result of the blood flowing out of the left ventricle and into the aorta and arteries. Pressure in the aorta and arterial system continues to rise as blood flows from the left ventricle. As the ventricle completes the contraction, pressure in the aorta begins to decrease and diastole begins. When the aortic valve closes, pressure in the aorta increases temporarily. The closing of the valve and temporary increase in pressure can be seen in graphs of waveforms as a "dicrotic notch."

In the same way the dicrotic notch marks the closing of the pulmonary and aortic valves, the anacrotic notch marks the opening of the aortic valve. As the ventricles enter the systole phase, the rising pressure in the aorta decreases momentarily as a result about the time the aortic valve opens. In the waveform this event is called the anacrotic notch and occurs at the opening of the aortic valve. This notch is generally visible only in central aortic pressure monitoring or in some pathological conditions such as arterial stenosis.

Dicrotic and anacrotic notches reflect the brief change in the waveform that occurs as a result of the opening and closing of the pulmonary and aortic valves. The timing and magnitude of the dicrotic and anacrotic notch is a relatively consistent and substantially unique cardiovascular trait for each person. In the present invention, by monitoring the arterial pressure with an infrared light, a consistent and substantially unique individualized wave pattern can be generated based on the hemodynamic waveform, and in particular, the dicrotic and/or anacrotic notch.

Vasoconstriction of the arteries results in a diastolic pressure. During the period of diastole, blood moves through the larger arteries into smaller arterial branches. The movement of the blood during diastole (such as from the larger to smaller branches) creates some pressure in the arterial system. This pressure is known as diastolic pressure.

Pulse pressure may also be a component of the waveform of the present invention. Pulse pressure represents the difference between the systolic and diastolic pressure. Stroke volume and vascular compliance may also be reflected in the composite wave of the present invention.

The waveform corresponding to a biometric marker of a user is initially measured and stored in an electronic form. The stored waveform can then be compared to subsequent measured waveforms and, based upon the similarities of the stored waveform and measured waveform, grant or deny access to a device or authorization for transaction. An electric biometric marker may be combined with at least one other biometric marker associated with a system of the user's body or a histological trait of the user. By "layering" the circulatory biometric marker with at least one other marker, embodiments enhance the security. In one example, an electronic apparatus employs an internal biometric marker that is not representative of a particular physiological or anatomical trait.

Means for measuring, recording, and storing the biometric markers employed in embodiments of the present invention may be any suitable means known in the art. For example, measurement means using absorbed or deflected light rays and/or electrical impulses or signals. Means for measuring may include devices capable of measuring pressure differentials, temperature changes, impedance changes, current movement, distance, frequency, magnetics, physical interactions, luminescence and radioactivity.

One embodiment comprises a signal transmitter and a signal receiver. The signal transmitter transmits energy into dermal and subdermal tissues of the user of a biometric authentication device. The energy transmitted is partly absorbed into the tissues and partly reflected by the tissues. The signal receiver captures the reflected energy and measures the received signal to create a signal profile that represents the absorption and reflection of the signal. The signal data may be collected over any length of time reasonable for authentication purposes. At least one aspect of the data received represents a constant and repeatable characteristic of the signal as absorbed and reflected by the tissues. Furthermore, at least one of the constant and repeatable characteristics is a characteristic that is substantially unique to each person. The resulting constant, repeatable, and substantially unique measurement can be used as a biometric identifier.

Figure 8:
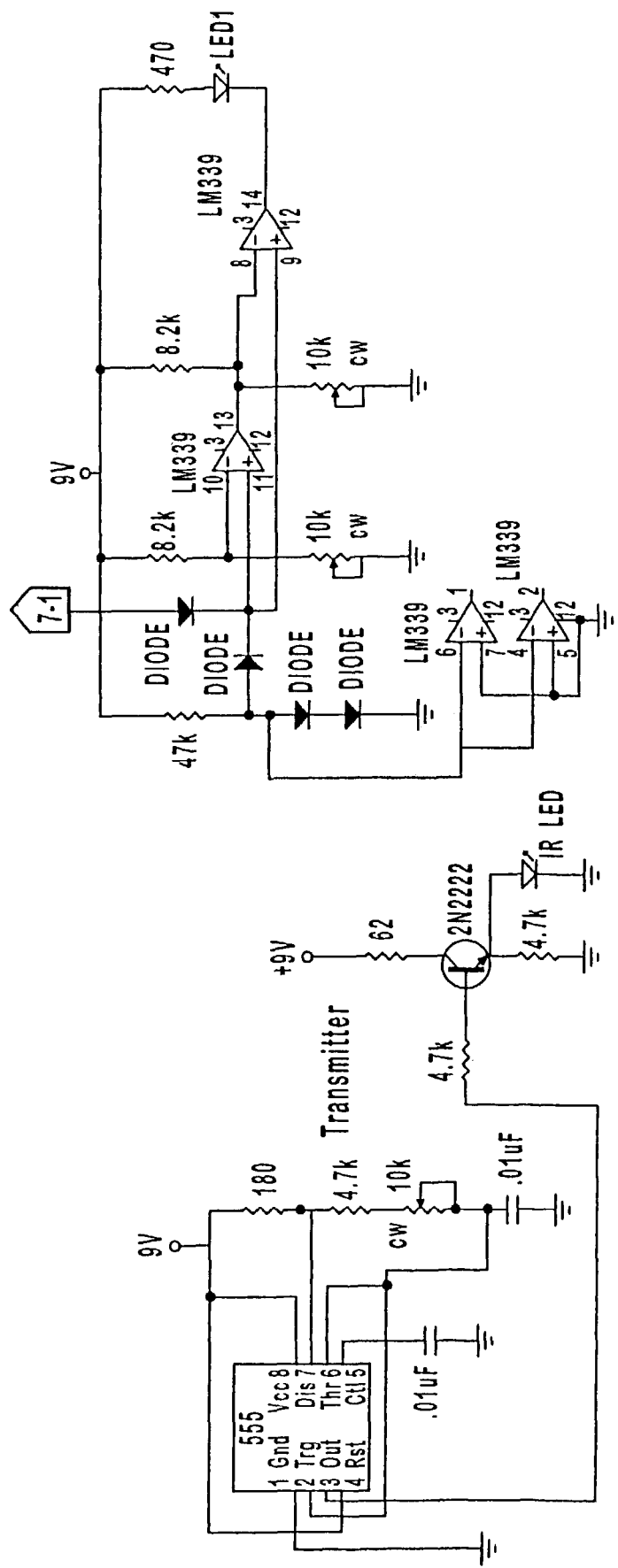
FIG. 8 illustrates a schematic diagram of one embodiment of a transmitter of the present invention.

In one embodiment, the signal transmitter emits infrared energy, which is absorbed and reflected by dermal and subdermal layers of a user of the biometric authentication device. The signal transmitter may be an infrared transmitter, such as a light emitting diode, which directs energy into the finger of the user of the biometric authentication device. One embodiment of the present invention is represented by schematic of FIG. 8. The IR transmitter transmits at a high-energy audio frequency, and is preferably in close proximity to the user's dermal and subdermal tissues. For example, the user may put the user's finger over the light emitting diode in order for the infrared energy to be transmitted into dermal and subdermal tissues and therein be partly absorbed and partly reflected.

The amount of infrared energy that is reflected or absorbed will be partly dependent upon and partly modulated by the anatomical structures and physiological processes taking place within the tissues. Because the anatomical structure and physiological processes of each person will be slightly different, the reflected energy received by the signal receiver will vary from person to person. These structures and processes will uniquely modify the amount of the energy that is absorbed and the amount that is reflected. Many of the structural and physiological differences between individuals will directly affect the absorption and reflection of the energy while others will indirectly affect absorption and reflection. Arterial wall strength, which may vary from individual to individual, creates resistance to blood flow and may affect the timing of the cardiac cycle. Thus, the specific arterial wall strength of an individual user may, because of the structure of the material wall, uniquely modify the signal or, may because of its influence on the flow of blood through the arteries, likewise modify the amount of signal absorbed and the amount reflected. In the case of infrared absorption and reflection of the preferred embodiment, the amount of infrared energy returning to the signal receiver will be modified or modulated by the user's anatomy, such as his or her bone structure, and by physiological processes, such as the user's blood flow. When infrared energy is absorbed and/or reflected by dermal and subdermal tissues, the reflected energy may represent the combined effect of anatomical structures and physiological processes. Thus, the energy received by the signal receiver of the preferred embodiment may be a composite signal that reflects more than just one anatomical structure or physiological process.

In one embodiment of the present invention, the signal receiver is an infrared photo receptor, which receives the infrared energy reflected back from the dermal and subdermal tissues as shown in FIG. 9. Biasing techniques, such as biasing transistors, may provide for better reception of the infrared energy signal.

The signal received by the infrared photoreceptor is processed, for example, by a processing module, in order for the signal to be stored and used as a biometric identifier. In the preferred embodiment, the photoreceptor receives energy preferably transmitted at high-energy audio frequency and conducts this energy signal through a band pass filter, which filters out high and low frequency components of the signal. The signal may be "decreased" using a baseband filter and a low pass filter. Thus processed, the signal is ready to be digitized into a preferable waveform. After being digitized, the signal, now in digital waveform, can be further filtered. Outside noise, such as might be present from electric outlets or electrical appliances, can be filtered out and the final digital waveform may be saved. The stored digital waveform will provide the basis for biometric identification.

In a preferred embodiment the signal may be modulated at a higher frequency and then brought back down to a lower base band frequency, which allows the infrared energy to radiate at less power. After the signal is transmitted, the signal can be captured and the low frequency noise filtered out. It is a unique advantage of one embodiment of the present invention to filter out background noise by transmitting the signal that is to be used for biometric identification at a relatively high frequency. The final waveform is stored in a memory module and may represent a composite waveform reflecting anatomical structure and physiological processes, such as blood flow, heart rate, blood pressure, and surrounding bone and blood vessel structure.

The waveform may itself represent a unique biometric marker or may, through a process of layering or applying algorithms to the waveform, yield characteristics substantially unique to each individual and which are constant and repeatable. Some waveforms may need to be "dissected" in order to analyze the various components of the waveform and properly compare waveforms of different users to provide authentication. In the preferred embodiment, the waveform is primarily associated with cardiovascular processes in the body, however, the waveform could represent any one or more of the body's internal physiological processes or anatomical structures.

Anticipating that the physiological and anatomical attributes of a user of the present invention will change over time, the present invention provides for a method of self-calibration. Self-calibration allows the stored, authenticating signal or waveform to be modified to coincide with the changes in the user's physiological and anatomical attributes over time. For example, if the authentication system involves monitoring cardiovascular function, the user's heart function changes with time and the signal received from the authorized user may also slightly change over time. Thus, the authorized user's signal may be slightly different from the originally stored, authenticating signal.

In order to allow for the changes that occur in the user's body, the authentication program of the present invention provides for some degree of variance between the stored, authenticating waveform and an authorized user's waveform. The program can track such variances over time and modify the stored authenticating waveform to more closely match the slightly changed waveform of the authorized user, if necessary. Self-calibration allows the authenticating signal to be modified within a statistical limit, to more closely match a gradually changing waveform of an authorized user. Thus, as small and insubstantial changes in the authorized user's waveform increase over time, the authenticating signal can also be changed. Self-calibration may be applied by the use of a calibration program and is preferably an automatic and continuous calibration that is performed upon each use of the authentication device.

When a received signal is compared to an authenticating signal, if the signals or waveforms are statistically identical, the present invention will transmit a validating signal, which may activate a switch or otherwise enable a device. Where the signals or waveforms are not statistically identical, a signal indicating the waveform is "invalid" is generated. When the signal is not valid, the biometrically activated switch will remain off or the device will remain disabled.

In one preferred embodiment, the signal transmitter and the signal receiver constitute an infrared light emitting diode placed in an on/off button for a biometrically activated device. The signal receiver can be a photoreceptor connected to a single chip solution and integrated into PCA of a portable electronic device. The photoreceptor may be located in the same plane as the LED and may be positioned relatively near to the transmitter. For example, in one embodiment, the photoreceptor is embedded in the same on/off button as the LED and is approximately a quarter inch away from the LED.

Figure 3:
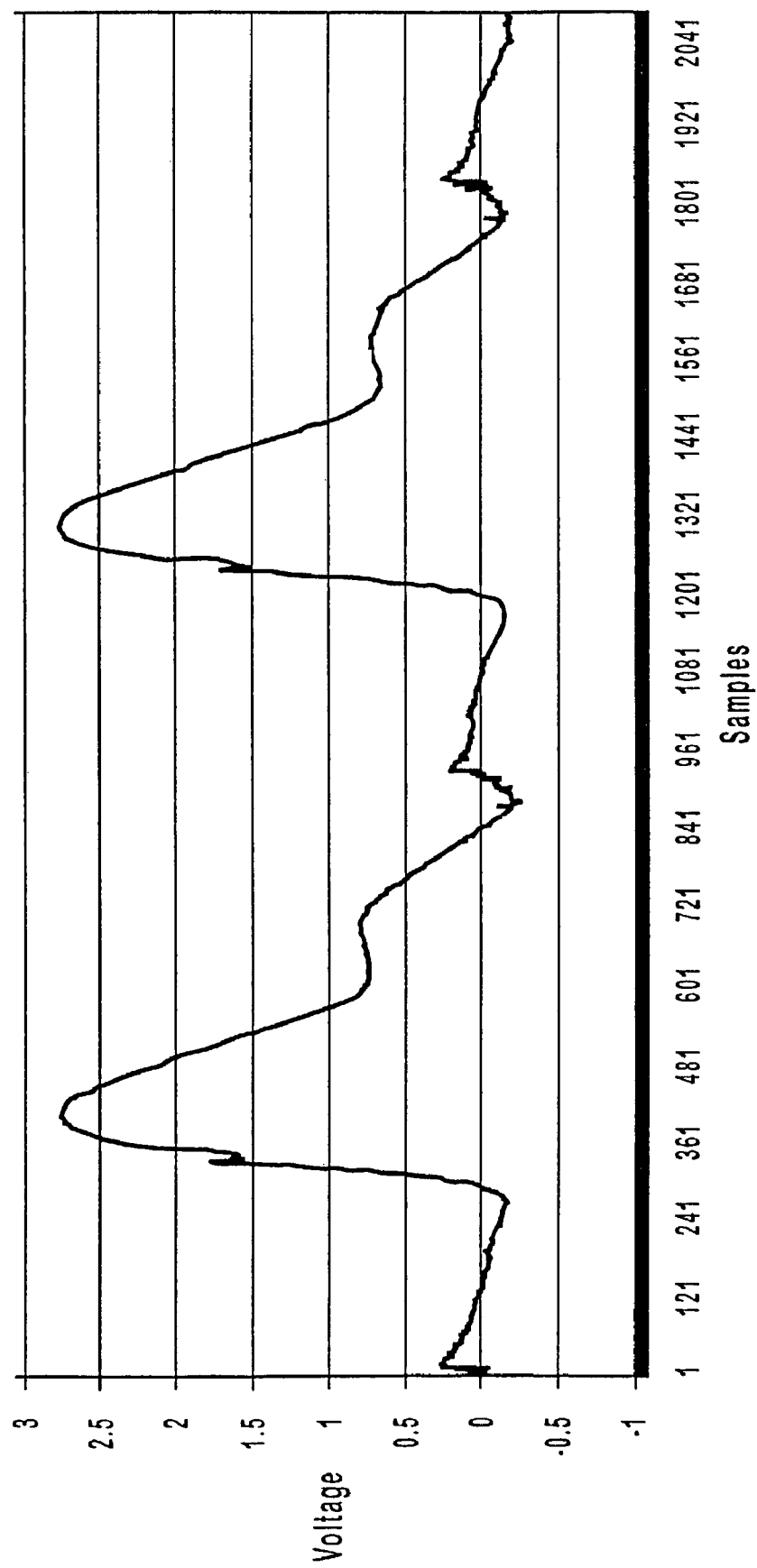
FIG. 3 illustrates a front view of an electronic appliance having a biometric authentication device disposed within.

FIG. 3 illustrates an electronic appliance 40 having a biometric authentication device 42. A biometric authentication device comprises a sensor, switch or button 56 for enabling the electronic appliance 40, in this case as mobile phone. The biometric authentication device 42 is incorporated into the power button 56 of the phone so that the signal transmitter 50 (optional) and the signal receiver 52, which receives the electrical signal from the individual's body, are in the same plane and are proximate to each other. FIG. 4 shows the biometric authentication device 42 being connected to a single chip 60 that is integrated into the PCA of the phone 40. The signal transmitter 50 is connected to the chip 60 through transmitter wires 62 and the signal receiver is connected to the chip through receiver wires 64.

The signal transmitter 50 can be any-transmitter known or used in the art capable of transmitting energy into dermal and subdermal layers such that the energy signal is partly absorbed and/or partly reflected back toward the signal receiver 52. The signal receiver 52 can likewise be any device capable of receiving the partly reflected signal or receiving an electrical signal from the individual's body. One embodiment, signal transmitter 50 is an infrared light emitting diode and signal receiver 56 is a photoreceptor or electrical sensor.

Figure 5:
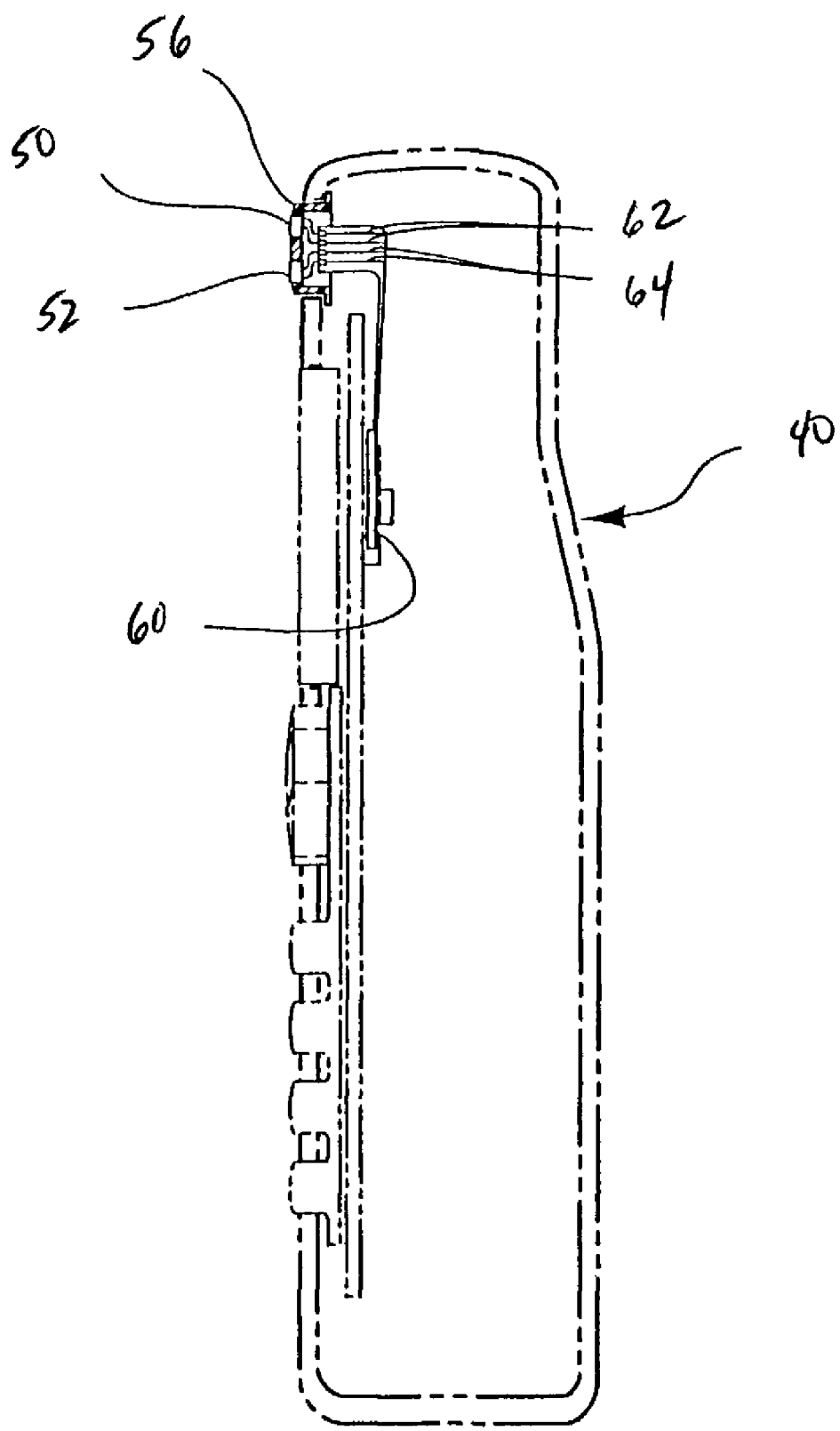
FIG. 5 illustrates a cut away side view of the embodiment of FIG. 3.

FIG. 5 shows a side view of the present invention with a signal receiver 60 and a signal transmitter 52 being connected to receiver wires 64 and transmitter wires 62 leading to the chip 60. The signal receiver 52 and signal transmitter 60 are embedded in the button 56, which is disposed in the phone 40.

Figure 6:
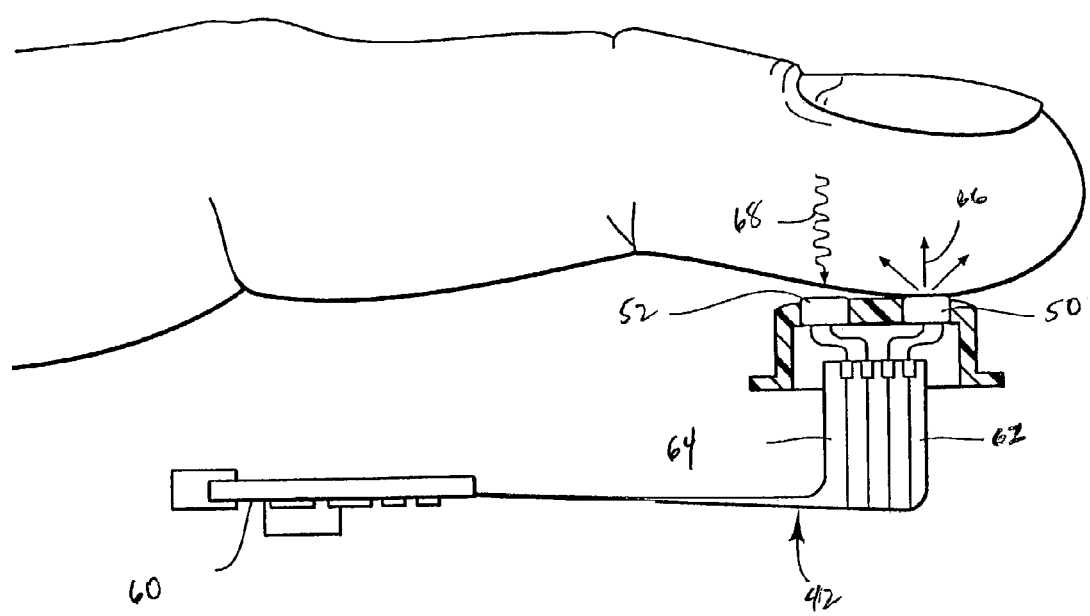
FIG. 6 illustrates a cut away side view of the embodiment of FIG. 3, the electronic appliance is not shown.

FIG. 6 illustrates a user's finger absorbing energy from the signal transmitter 50 and receiving reflected energy from the dermal and subdermal tissues of the user's finger in the signal receiver 52, or alternatively receiving an electrical signal at signal receiver 52.

Figure 7:
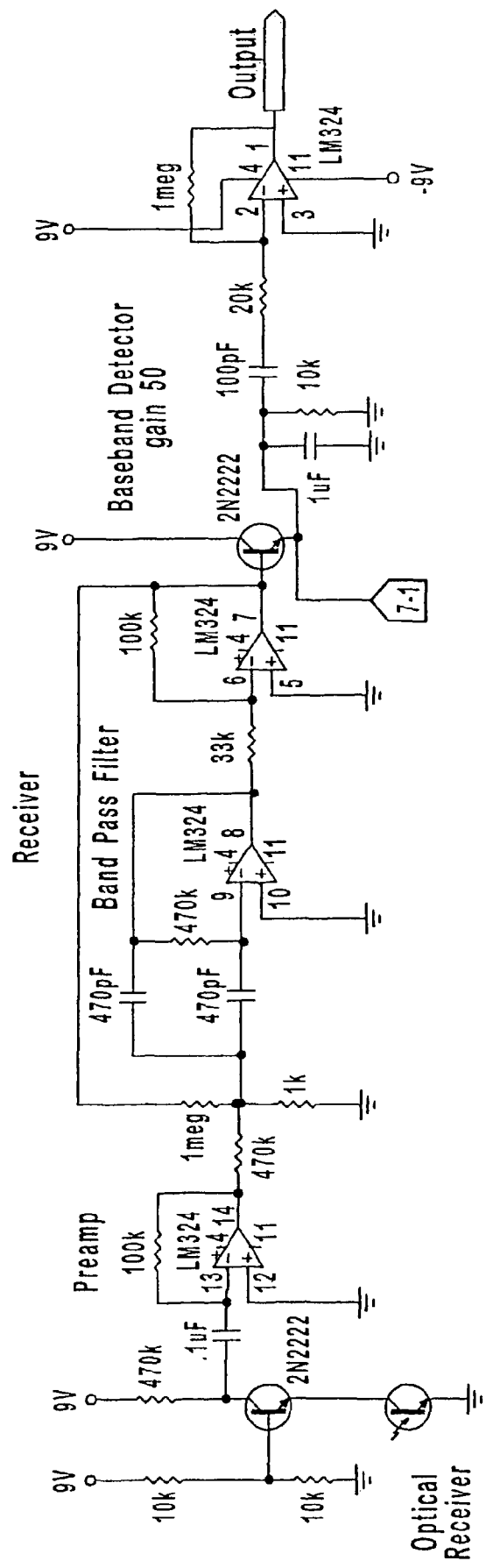
FIG. 7 illustrates a waveform of the present invention capable of use as a biometric marker.

The signal transmitter 50 is activated by the placement of the finger on the button 56. The signal transmitter 50 is preferably activated when the user places his or her finger on the button 56. The signal transmitter 50 may be activated by pressure from the user's finger, by an optical switch, motion detector, or heat sensor, electrical contact or any other means for activation. When the signal transmitter 50 is used and activated, a signal 66 is emitted from the signal transmitter 50 and is transmitted into the user's dermal and subdermal tissues. The signal 66 is partly absorbed and partially reflected by the dermal and subdermal tissues. The reflected signal 68 or alternatively an electrical signal is received by a signal receiver 52 and transmitted through receiving wires 64 to the chip 60. Within the chip 60, the received signal 68 is processed and transformed into a biometric identifier such as a digital waveform shown in FIG. 7. The biometric identifier is then compared to the stored, authenticating biometric identifier. If the received biometric identifier is the same as the stored, authenticating biometric identifier, the device 40 is enabled.

In one embodiment of the present invention, a biometric authentication system uses multiple biometric markers for authentication in a transaction. Using an infrared reading device comprising a signal transmitter and a signal receiver both connected to a processing module and a memory module, or alternatively an electrical signal receiver connected to a processing module and a memory module, biometric markers based upon a composite waveform are taken. In alternative embodiments, different cardiovascular related biomarkers are measured, including electrical signals. The biometric profile based upon the composite waveform is created and stored in the device. When a user wishes to authenticate his participation in a transaction, the user places his finger on the infrared reading device or signal receiver allowing the system to obtain measurements on the biometric markers. The biometric markers are processed and compared to those stored. Where the biometric markers match the individual is able to authenticate his participation in the transaction.

In another embodiment, a biometric authentication system is provided to control access or to authenticate. The system comprises electronically recording biometric markers using an electronic recording instrument. The electronic recording instrument measures at least one biometric marker, such as an electric signal and/or other marker. The measured trait is capable of acting as a biometric marker because it is selected from the traits that are substantially unique. If a trait or measurement taken from one individual has only at least approximately a one in two chance of being the same as the measurement of that same physical trait taken from another person the trait is substantially unique. The trait is also a trait that is substantially consistent when measured for the same person and is preferably capable of being measured in a noninvasive method. The trait is a trait associated with the integumentary system.

Use of the integumentary system in the biometric authentication system of this embodiment provides relatively easy access to the biometric markers, since the integumentary system is relatively superficial as compared to other systems. The integumentary system also provides an effective line of defense against infection. Thus, if a biometric authentication system requires several users to come into contact with the biometric system, the integumentary system acts as a barrier to the passing of infection whereas other tissues may not provide such a barrier. Moreover, the integumentary system provides several layers of integument from which biometric markers can be taken. Glandular activity of the integument and other epidermal derivatives such as hair and nails may also supply biometric markers for use with this exemplary embodiment of the present invention.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. In other words, the stored profile will act as a password, preventing access to the device unless a substantially identical biometric profile is measured by the device. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is selected from the traits that are substantially unique. The trait is also a trait that is substantially consistent when measured for the same person and is preferably capable of being measured in a noninvasive method. The trait is a trait associated with the skeletal system.

Use of the skeletal system in this embodiment of the present invention provides a relatively stable and relatively unchanging system from which biometric markers can be taken. The variety of tissues and structures and various physiological processes associated with the skeletal system and articulating joints may provide multiple biometric markers with this preferred embodiment. For example, biometric markers related to ligament layering may be found to be effective biometric markers.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is selected from the traits that are substantially unique, in other words the trait measurement taken from one individual has only at least a one in two chance of being the same as the measurement of that same physical trait taken from another person. The trait is also a trait that is substantially consistent when measured for the same person and is preferably capable of being measured in a noninvasive method. The trait is a trait associated with the muscular system.

Use of the muscular system in this preferred embodiment of a biometric authentication device may provide numerous potential biometric markers because of the highly specific and specialized function of the various muscles in the muscular system. For example, the human hand is an extremely complex portion of the muscle system. This complex system allows for intricate movement of the hand in response to various stimuli. It is believed that substantially unique biometric markers relating to the muscular system, and in particular to the muscular system of the hand, exist. For example, the duration of action potentials and their effect on a particular muscle may be a potential biometric marker that can be used in this preferred embodiment of the present invention.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electrical signal and/or other marker, using an electronic recording instrument. The electronic recording instrument measures at least one biometric marker. The measured trait is capable of acting as a biometric marker because it is selected from the traits that are substantially unique. The trait is also a trait that is substantially consistent when measured for the same person and is preferably capable of being measured in a noninvasive method. The trait is a trait associated with the respiratory system.

The respiratory system provides a relatively consistent and systematic physiological process to be monitored, particularly as it relates to pulmonary activity and the supply of oxygen and removal of carbon dioxide from the blood stream. Respiratory activity in many instances can be easily monitored. The inventors believe that there are multiple respiratory characteristics that are substantially unique to each individual and that such characteristics may be employed in a biometric authentication system. For example, measurements relating to $O_2$ and $CO_2$ content in various tissues may be found to be suitable as a biometric marker.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the cardiovascular system.

Because of the remarkable ability of the heart to continually and rhythmatically pump blood through the cardiovascular system, the cardiovascular system provides numerous biometric markers for use in this preferred embodiment. The cardiac cycle alone as explained above in Example 1, undergoes both an electrical and physical phenomena that result in potential biometric markers. The fluid dynamics of the vascular system also provide potential biometric markers.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the sensory system.

Use of the sensory system as a source for biometric markers provides a number of highly specialized reactions that can be readily tested. This is because the sensory system is specifically designed to receive stimuli from the external environment. For example, the dilatory response of the eye to a certain amount of light may provide a potential biometric marker.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or another marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the nervous system.

Because of the anatomically ubiquitous nature of the nervous system, and its ability to respond to electric stimulus, the nervous system provides a number of biometric markers that may be used in this embodiment. For example, the response of a particular nerve or bundle of nerves to a measured electrical stimulus may provide a biometric marker for use in this embodiment.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with a metabolic system.

The numerous metabolic processes of the body provide a number of biometric markers for use in the present invention. For example, the ability of certain tissues to absorb or release heat over time and the body's ability generally to control internal temperatures may provide a biometric marker.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the dicrotic notch and/or anacrotic notch of a person's hemodynamic waveform.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the anacrotic notch of a person's cardiac waveform.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

In another embodiment, a biometric authentication system is provided to control access or to authenticate. The system comprises electronically recording biometric markers, such as an electric signal and/or other marker, using an electronic recording instrument. The electronic recording instrument measures at least one biometric marker. The measured trait is capable of acting as a biometric marker because it is selected from the traits that are substantially unique, in other words the trait measurement taken from one individual has only at least a one in two chance of being the same as the measurement of that same physical trait taken from another person. The trait is also a trait that is substantially consistent when measured for the same person and is preferably capable of being measured in a noninvasive method. The trait is a trait associated with cardiovascular processes as exhibited in a person's finger.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. In other words, the stored profile will act as a password preventing access to the device unless a substantially identical biometric profile is measured by the device.

The device is designed so that before the device is fully activated, the device must measure and compare a user's biometric profile with the authorized biometric profile. If the biometric profile measured is substantially identical to the stored biometric profile, then the user may be granted access to the device.

In another embodiment, the biometric device is used to grant access to a personal computer or some similar electronic device. In this example, the signal transmitter or electronic signal receiver is built into the keyboard, mouse, tower or monitor of the personal computer. The signal transmitter/receiver may be activated by turning on the computer and activating the transmitter/receiver or the transmitter/receiver may itself regulate the power supply to the computer. The signal transmitter, if used, sends energy into dermal and subdermal tissues of the user of a biometric authentication device. Alternatively, the signal receiver receives an electric signal from the user. Thus, for example, the user may place his or her finger onto the transmitter/receiver located on mouse in which the present invention is disposed. The energy transmitted is partly absorbed into the tissues of the finger and partly reflected by the tissues. The signal receiver then captures the reflected energy and measures the received signal to create a biometric profile. Alternatively, the biometric profile is obtained from the electric signal received from the user.

When the biometric profile matches the authorized biometric profile, the author is granted access to the use the computer, access certain data, or run an application. The storage and processing power of the computer may be utilized to facilitate the biometric identification procedure.

Thus, as discussed herein, the embodiments of the present invention embrace obtaining biometric identification to activate a device or authenticate a participant in a transaction using histological and/or physiological traits. More particularly, the present invention relates to systems and methods for employing histological and physiological biometric markers that are substantially unique to an individual in order to permit an individual to activate a device, participate in a transaction, or identify himself or herself, wherein at least one biometric marker is obtained by one or more electrical contacts on the surface of the skin.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of authenticating a user, comprising a computing device performing the steps of:
    acquiring a first measurement of a first specific internal, non-volitional electrical process occurring within the user using a sensor coupled to a handheld device;
    acquiring a second measurement of a second different, specific, internal biological structure of the user using the sensor, wherein the first measurement comprises different measurements than the second measurement;
    layering the first measurement of the first specific internal, non-volitional electrical process and the second measurement of the second specific, internal biological structure into a layered biometric marker, the layered biometric marker comprising the first measurement of the first specific internal, non-volitional electrical process and the second measurement of the second internal biological structure;
    comparing the first measurement of the first specific internal, non-volitional electrical process of the layered biometric marker to a biometric profile of the user and the second measurement of the second specific, internal biological structure of the layered biometric marker to the biometric profile of the user; and
    authenticating the user if the first measurement of the layered biometric marker corresponds to the biometric profile of the user and the second measurement of the layered biometric marker corresponds to the biometric profile of the user.

2. The method of claim 1, wherein the first measurement of the internal, non-volitional electrical process corresponds to electrical activity of the user's cardiovascular system.

3. The method of claim 1, wherein the first measurement of the internal, non-volitional electrical process corresponds to a heartbeat of the user.

4. The method of claim 1, wherein the first measurement of the internal, non-volitional electrical process corresponds to a heartbeat waveform of the user.

5. The method of claim 1, wherein the first measurement of the internal, non-volitional electrical process corresponds to a fluid dynamic of the user's vascular system.

6. The method of claim 1, further comprising the computing device establishing a biometric profile of the user by:
    measuring the first internal, non-volitional electrical process occurring within the user using a sensor;
    layering the first measurement of the internal, non-volitional electrical process with a second measurement of the internal biological structure of the user into a biometric marker; and
    storing the layered biometric marker in a biometric profile of the user.

7. The method of claim 1, further comprising the computing device establishing a biometric profile of the user by:
    accessing a plurality of measurements of the first internal, non-volitional electrical process occurring within the user;
    combining the plurality of measurements of the first internal, non-volitional electrical process;
    layering the combined plurality of measurements with a measurement of the second internal biological structure of the user into a biometric marker; and
    storing the layered biometric marker in a biometric profile of the user.

8. The method of claim 7, wherein combining the plurality of measurements of the first internal, non-volitional electrical process comprises averaging the plurality of measurements.

9. The method of claim 1, wherein the sensor is integrally coupled to the handheld device.

10. The method of claim 1, wherein the handheld device is a mobile phone.

11. The method of claim 1, wherein the measurement of the second specific, internal biological structure of the user is obtained by transmitting an energy signal toward the user.

12. A computer-readable storage medium comprising instructions to cause a computing device to perform a method of authenticating a user, the method comprising:
    acquiring a first measurement of a first specific internal, non-volitional electrical process occurring within the user using a sensor coupled to a handheld device;
    acquiring a second measurement of a second different, specific, internal biological structure of the user using the sensor, wherein the first measurement comprises different measurements than the second measurement;
    layering the first measurement of the first specific internal, non-volitional electrical process and the second measurement of the second specific, internal biological structure into a layered biometric marker, the layered biometric marker comprising the first measurement of the first specific internal, non-volitional electrical process and the second measurement of the second internal biological structure;

comparing the first measurement of the first specific internal, non-volitional electrical process of the layered biometric marker to a biometric profile of the user and the second measurement of the second specific, internal biological structure of the layered biometric marker to the biometric profile of the user; and authenticating the user if the first measurement of the layered biometric marker corresponds to the biometric profile of the user and the second measurement of the layered biometric marker corresponds to the biometric profile of the user.

13. The computer-readable storage medium of claim 12, wherein the measurement of the first specific internal, non-volitional electrical process corresponds to electrical activity of the user's cardiovascular system.

14. The computer-readable storage medium of claim 12, wherein the measurement of the first specific internal, non-volitional electrical process corresponds to a heartbeat of the user.

15. The computer-readable storage medium of claim 12, wherein the measurement of the first specific internal, non-volitional electrical process corresponds to a heartbeat waveform of the user.

16. The computer-readable storage medium of claim 12, wherein the measurement of the first specific internal, non-volitional electrical process corresponds to a fluid dynamic of the user's vascular system.

17. The computer-readable storage medium of claim 12, wherein the method further comprises establishing a biometric profile of the user by:

measuring the first internal, non-volitional electrical process occurring within the user using a sensor;

layering the measurement of the first specific internal, non-volitional electrical process with a measurement of a different, second internal biological structure of the user into a biometric layered marker; and storing the layered biometric marker in a biometric profile of the user.

18. The computer-readable storage medium of claim 12, wherein the method further comprises establishing a biometric profile of the user by: accessing a plurality of measurements of the first specific internal, non-volitional electrical process occurring within the user;

combining the plurality of measurements of the first specific internal, non-volitional electrical process;

layering the combined plurality of measurements with a measurement of the second specific internal biological structure of the user into a layered biometric marker; and storing the layered biometric marker in a biometric profile of the user.

19. The computer-readable storage medium of claim 18, wherein combining the plurality of measurements of the first specific internal, non-volitional electrical process comprises averaging the plurality of measurements.

20. The computer-readable storage medium of claim 12, wherein the sensor is integrally coupled to the handheld device.

21. The computer-readable storage medium of claim 12, wherein the handheld device is a mobile phone.

22. The computer-readable storage medium of claim 12, wherein the measurement of the second specific, internal biological structure of the user is obtained by transmitting an energy signal toward the user.

23. A handheld communication device, comprising:

a sensor coupled to the handheld communication device and configured to acquire a first measurement of a first internal, non-volitional electrical process within a user, and a second measurement of a second, different internal biological structure of the user, wherein the first measurement comprises different measurements than the second measurement;

a processor to translate the first measurement of the first internal, non-volitional electrical process into a first biometric marker, and the second measurement of the second internal biological structure into a second biometric marker;

wherein the processor is configured to authenticate the user when both the first biometric marker and the second biometric marker correspond to a biometric profile of an authorized user of the device.

24. The handheld communication device of claim 23, wherein the sensor is integrally coupled to the handheld communication device.

25. The handheld communication device of claim 23, wherein the measurement of the second, internal biological structure of the user is acquired by transmitting an energy signal towards the user.

26. The handheld communication device of claim 23, wherein the sensor is configured to measure a plurality of different internal, biological characteristics of the user including the second internal biological structure.

27. The handheld communication device of claim 23, wherein the first specific internal, non-volitional electrical process corresponds to cardiac activity of the user.

* * * * *